(12) United States Patent
Caretta et al.

(10) Patent No.: US 12,352,628 B2
(45) Date of Patent: Jul. 8, 2025

(54) APPARATUS FOR MEASURING THE POLARIZATION OF AN ELECTROMAGNETIC RADIATION AND CORRESPONDING METHOD OF USE

(71) Applicant: ELETTRA—SINCROTRONE TRIESTE S.C.P.A, Trieste (IT)

(72) Inventors: Antonio Caretta, Trieste (IT); Simone Laterza, Trieste (IT); Marco Malvestuto, Duino-Aurisina (IT)

(73) Assignee: ELETTRA—SINGCROTRONE TRIESTE S.C.P.A., Trieste (IT)

( * ) Notice: Subject to any disclaimer, the term of this patent is extended or adjusted under 35 U.S.C. 154(b) by 158 days.

(21) Appl. No.: 18/282,431

(22) PCT Filed: Feb. 25, 2022

(86) PCT No.: PCT/IT2022/050036
§ 371 (c)(1),
(2) Date: Sep. 15, 2023

(87) PCT Pub. No.: WO2022/195635
PCT Pub. Date: Sep. 22, 2022

(65) Prior Publication Data
US 2024/0183715 A1 Jun. 6, 2024

(30) Foreign Application Priority Data
Mar. 18, 2021 (IT) .......................... 102021000006434

(51) Int. Cl.
*G01J 4/04* (2006.01)
*G02B 7/182* (2021.01)

(52) U.S. Cl.
CPC .............. *G01J 4/04* (2013.01); *G02B 7/1824* (2013.01)

(58) Field of Classification Search
CPC .... G01J 4/04; G01J 4/00; G01J 3/2823; G01J 3/36; G01J 3/02; G01J 3/0208; G01J 3/0224; G01J 3/021; G01J 3/2803; G01J 3/447; G01J 2003/2826; G01J 3/0256; G01J 2005/0077; G01J 3/0286; G01J 3/10;
(Continued)

(56) References Cited

U.S. PATENT DOCUMENTS

| 9,383,306 B2* | 7/2016 | Koerner ............. G01B 9/02091 |
| 2005/0163365 A1* | 7/2005 | Barbour ................... G01J 3/36 |
| | | 382/312 |
| 2014/0354991 A1* | 12/2014 | Li ......................... G02B 27/14 |
| | | 356/367 |

FOREIGN PATENT DOCUMENTS

CN 107567584 A * 1/2018 ............. G01B 11/14

OTHER PUBLICATIONS

International Search Report and Written Opinion of PCT/IT2022/050036 dated Aug. 8, 2023, 12 pages.
(Continued)

*Primary Examiner* — Michael P Stafira
(74) *Attorney, Agent, or Firm* — Rankin, Hill & Clark LLP

(57) ABSTRACT

The invention concerns an apparatus (50) for measuring the polarization of an electromagnetic radiation (100) in the Extreme Ultraviolet, comprising a source (200) of said radiation (100) and a polarimeter (10) on which said radiation (100) is incident. The polarimeter (10) can be configured at least to detect the polarization angle of the radiation (100) and, possibly, to calculate the degree of polarization. The invention also concerns a method for using said apparatus (50).

13 Claims, 3 Drawing Sheets

(58) Field of Classification Search
CPC .......... G01J 3/0232; G01J 3/0218; G01J 3/28;
G01J 5/0014; G01J 3/0229; G01J 5/0804;
G01J 5/20; G01J 9/0215; G01J 3/12;
G01J 3/45; G01J 3/453; G01J 9/00; G01J
3/0205; G01J 5/0806; G01J 3/0297; G01J
3/42; G01J 3/04; G01J 3/2889; G01J
3/44; G01J 5/42; G01J 11/00; G01J
3/0216; G01J 3/0264; G01J 5/0802; G01J
5/53; G01J 5/80; G01J 3/0289; G01J
3/0294; G01J 3/26; G01J 9/02; G01J
1/0414; G01J 2001/4247; G01J 3/0237;
G01J 3/0262; G01J 2003/283; G01J
3/0202; G01J 3/18; G01J 3/4531; G01J
1/0403; G01J 1/0407; G01J 2009/002;
G01J 3/1804; G01J 3/32; G01J 3/4412;
G01J 4/02; G01J 2003/104; G01J
2003/1217; G01J 2003/1221; G01J
2003/123; G01J 2003/1239; G01J
2003/1247; G01J 2003/1291; G01J
2003/2806; G01J 2003/282; G01J
2003/2869; G01J 2005/604; G01J 3/0235;
G01J 3/0291; G01J 5/0003; G01J 5/02;
G01J 5/026; G01J 5/047; G01J 5/061;
G01J 5/07; G01J 5/08021; G01J 5/0808;
G01J 5/0896; G01J 5/602; G01J 1/0411;
G01J 1/0429; G01J 1/08; G01J 1/42;
G01J 2003/1213; G01J 2003/1269; G01J
2005/103; G01J 2011/005; G01J 3/0272;
G01J 3/4537; G01J 5/0066; G01J 5/08;
G01J 5/10; G01J 5/532; G01J 5/59; G01J
9/04; G01J 1/02; G01J 1/0266; G01J
1/04; G01J 1/4257; G01J 2003/1282;
G01J 2003/4424; G01J 2003/452; G01J
2005/283; G01J 2009/0261; G01J 3/0213;
G01J 3/0221; G01J 3/0248; G01J 3/0259;
G01J 3/0278; G01J 3/108; G01J 3/4406;
G01J 3/443; G01J 3/4535; G01J 5/0007;
G01J 5/0875; G01J 5/28; G01J 9/0246;
G02B 5/3083; G02B 27/0172; G02B
5/30; G02B 27/286; G02B 5/305; G02B
27/283; G02B 17/0856; G02B 5/3041;
G02B 5/3058; G02B 2027/0138; G02B
2027/013; G02B 27/0081; G02B 27/0093;
G02B 5/3066; G02B 17/0804; G02B
2027/011; G02B 27/144; G02B 27/145;
G02B 13/0055; G02B 27/0068; G02B
27/0905; G02B 27/0983; G02B 27/148;
G02B 17/0896; G02B 27/28; G02B
7/021; G02B 27/101; G02B 2027/0123;
G02B 27/0176; G02B 2027/0118; G02B
1/10; G02B 2027/0194; G02B 21/04;
G02B 5/3025; G02B 5/3033; G02B
5/3016; G02B 1/04; G02B 5/32; G02B
27/48; G02B 5/208; G02B 5/285; G02B
1/14; G02B 27/141; G02B 26/105; G02B
5/201; G02B 1/002; G02B 1/041; G02B
5/1809; G02B 5/287; G02B 7/023; G02B
27/0018; G02B 27/14; G02B 27/288;
G02B 21/0076; G02B 21/16; G02B
27/1006; G02B 5/04; G02B 5/10; G02B
5/18; G02B 6/0053; G02B 2027/014;
G02B 2027/0178; G02B 26/10; G02B
27/017; G02B 5/23; G02B 5/28; G02B
6/2713; G02B 6/4214; G02B 2003/0093;
G02B 30/25; G02B 5/3091; G02B 23/24;
G02B 23/2484; G02B 23/2423; G02B
27/142; G02B 27/62; G02B 3/00; G02B
5/0242; G02B 6/02052; G02B 6/02123;
G02B 6/105; G02B 6/2821; G02B 7/005;
G02B 2027/0174; G02B 27/10; G02B
5/0816; G02B 6/02147; G02B 6/266;
G02B 6/2852; G02B 6/29361; G02B
6/3604; G02B 7/025; G02B 26/08; G02B
26/0833; G02B 5/26; G02B 1/08; G02B
21/0092; G02B 23/2461; G02B 25/001;
G02B 26/004; G02B 27/285; G02B
5/1814; G02B 5/3008; G02B 6/0056;
G02B 6/0068; G02B 6/262; G02B 6/32;
G02B 7/003; G02B 2027/0125; G02B
2027/0187; G02B 23/2469; G02B 23/26;
G02B 3/02; G02B 5/008; G02B 5/0841;
G02B 6/0055; G02B 1/02; G02B 1/111;
G02B 21/0028; G02B 23/243; G02B
23/2476; G02B 26/0808; G02B 26/12;
G02B 27/0012; G02B 27/1013; G02B
5/02; G02B 6/0026; G02B 6/0035; G02B
6/0041; G02B 6/0046; G02B 6/02; G02B
6/02042; G02B 6/036; G02B 6/03605;
G02B 6/03622; G02B 6/03638; G02B
6/4298; G02B 1/005; G02B 2027/0109;
G02B 27/149; G02B 27/18; G02B 30/27;
G02B 5/0236; G02B 5/0247; G02B
5/0284; G02B 5/08; G02B 6/0011; G02B
6/005; G02B 6/0065; G02B 6/12007;
G02B 6/29301; G02B 6/29395; G02B
6/4206; G02B 1/11; G02B 2027/0112;
G02B 2027/0161; G02B 2207/101; G02B
26/00; G02B 26/008; G02B 27/0043;
G02B 27/0103; G02B 27/027; G02B
27/106; G02B 27/126; G02B 27/4205;
G02B 27/4261; G02B 3/0031; G02B
3/14; G02B 5/005; G02B 5/0257; G02B
5/0263; G02B 5/045; G02B 5/0808;
G02B 5/0825; G02B 5/203; G02B
6/0028; G02B 6/0038; G02B 6/0043;
G02B 1/00; G02B 1/043; G02B
2005/1804; G02B 2006/0098; G02B
21/0016; G02B 21/0032; G02B 26/06;
G02B 27/0075; G02B 27/08; G02B
27/646; G02B 3/0056; G02B 3/12; G02B
5/0205; G02B 5/0252; G02B 5/0273;
G02B 5/0278; G02B 5/1833; G02B
5/1847; G02B 5/20; G02B 5/22; G02B
6/0023; G02B 6/003; G02B 6/0051;
G02B 6/0076; G02B 6/2766; G02B
7/028; G02B 13/16; G02B 2027/012;
G02B 2027/0185; G02B 21/0004; G02B
21/26; G02B 21/33; G02B 26/023; G02B
27/0025; G02B 27/0916; G02B 27/0927;
G02B 27/1073; G02B 27/123; G02B
27/281; G02B 27/40; G02B 3/005; G02B
30/40; G02B 5/001; G02B 5/021; G02B
5/0294; G02B 5/205; G02B 5/281; G02B
5/3075; G02B 6/00; G02B 6/0001; G02B
6/0006; G02B 6/0036; G02B 6/0066;
G02B 6/24; G02B 6/278; G02B 6/42;
G02B 6/4204; G02B 6/4218; G02B
6/4225; G02B 6/43; G02B 7/1824; G02B
7/1825; G02B 1/115; G02B 1/12; G02B 1/18; G02B 13/0045; G02B 13/009; G02B 13/04; G02B 13/06; G02B 13/22; G02B 15/177; G02B 17/0621; G02B 17/08; G02B 19/0023; G02B 19/0028; G02B 19/0057; G02B 19/0066; G02B 19/0076; G02B 2027/0132; G02B 2027/0134; G02B 21/0068; G02B 21/10; G02B 21/14; G02B 21/18; G02B 21/36; G02B 21/361; G02B 21/365; G02B 21/367; G02B 23/06; G02B 23/14; G02B 26/005; G02B 26/0816; G02B 26/108; G02B 27/0037; G02B 27/01; G02B 27/09; G02B 27/0922; G02B 27/0944; G02B 27/0977; G02B 27/1066; G02B 27/12; G02B 27/30; G02B 27/4227; G02B 3/0068; G02B 3/0081; G02B 3/08; G02B 3/10; G02B 30/26; G02B 30/30; G02B 30/31; G02B 30/36; G02B 30/52; G02B 5/0268; G02B 5/12; G02B 5/1871; G02B 5/282; G02B 6/0003; G02B 6/001; G02B 6/006; G02B 6/04; G02B 6/1226; G02B 6/124; G02B 6/138; G02B 6/241; G02B 6/2706; G02B 6/272; G02B 6/2746; G02B 6/276; G02B 6/2773; G02B 6/2848; G02B 6/29311; G02B 6/29341; G02B 6/3504; G02B 6/4201; G02B 6/4246; G02B 6/4274; G02B 6/428; G02B 7/022; G02B 7/026; G02B 7/10; G02B 7/12; G02B 9/12; G02B 1/16; G02B 13/001; G02B 13/003; G02B 13/006; G02B 13/0065; G02B 15/14; G02B 15/16; G02B 15/163; G02B 17/0892; G02B 2006/12107; G02B 2027/0136; G02B 2027/0141; G02B 2027/0152; G02B 2027/0181; G02B 21/002; G02B 21/0052; G02B 21/0056; G02B 21/0072; G02B 21/06; G02B 2207/107; G02B 2207/117; G02B 2207/123; G02B 23/2453; G02B 26/0875; G02B 26/101; G02B 27/0056; G02B 27/0179; G02B 27/02; G02B 27/025; G02B 27/0938; G02B 27/0955; G02B 27/0988; G02B 27/0994; G02B 27/1046; G02B 27/108; G02B 27/1086; G02B 27/1093; G02B 27/143; G02B 27/4222; G02B 27/4233; G02B 27/4244; G02B 27/4255; G02B 27/4277; G02B 27/4294; G02B 27/46; G02B 3/0087; G02B 3/04; G02B 30/00; G02B 30/10; G02B 30/33; G02B 30/35; G02B 30/56; G02B 5/00; G02B 5/003; G02B 5/0221; G02B 5/06; G02B 5/1852; G02B 5/1857; G02B 5/223; G02B 6/0008; G02B 6/002; G02B 6/0025; G02B 6/0031; G02B 6/0033; G02B 6/0048; G02B 6/0061; G02B 6/0073; G02B 6/0096; G02B 6/02295; G02B 6/02309; G02B 6/10; G02B 6/12004; G02B 6/2555; G02B 6/26; G02B 6/29359; G02B 6/34; G02B 6/3628; G02B 6/4207; G02B 6/4208; G02B 6/4213; G02B 6/4296; G02B 7/04; G02B 7/08; G02B 7/28

See application file for complete search history.

(56) References Cited

OTHER PUBLICATIONS

Hoover R B et al: "Imaging Polarimeters for Solar Extreme Ultraviolet Astronomy", Optical Engineering, Soc. of Photo-Optical Instrumentation Engineers, Bellingham, vol. 30, No. 8, Aug. 1, 1991 (Aug. 1, 1991), pp. 1169-1176, XP000222822, ISSN: 0091-3286, DOI: 10.1117/12.55923 p. 1170-p. 1172.

Pelizzo M G et al: "Delay systems and phase retarders based on multilayers coated mirrors for FEL beam manipulation", Advances in X-Ray Free-Electron Lasers: Radiation Schemes, X-Ray Optics, and Instrumentation, SPIE, 1000 20th St. Bellingham WA 98225-6705 USA, vol. 8078, No. 1, May 5, 2011 (May 5, 2011), pp. 1-8, XP060013205, DOI: 10.1117/12.886885 p. 4-p. 5.

* cited by examiner

APPARATUS FOR MEASURING THE POLARIZATION OF AN ELECTROMAGNETIC RADIATION AND CORRESPONDING METHOD OF USE

FIELD OF THE INVENTION

Embodiments described here concern an apparatus for measuring the polarization of an electromagnetic radiation and the corresponding method of use.

The present invention is suitable to detect the electromagnetic field polarization in ultrashort pulsed sources in the extreme ultraviolet (EUV Extreme Ultraviolet) with linear polarization, in particular in pump-probe measurements in FEL or HHG type sources.

The scope of the invention may concern both diagnostic purposes and spectroscopic investigations, such as magneto-optics in the EUV range, simultaneous spectroscopy over time and in two colors and suchlike.

BACKGROUND OF THE INVENTION

The polarization of an electromagnetic radiation can change due to several physical phenomena: magnetic order, high-density plasma matter, impurity domains, deformation and suchlike. For measuring electromagnetic field polarization, represented for example by the direction of the electric field with respect to an axis orthogonal to the direction of propagation of the electromagnetic radiation itself for a linearly polarized radiation, and/or in general by the degree of polarization, instruments called polarimeters can be used, which are apparatuses suitable to detect the polarization of a radiation and the rotational power of optically active substances.

It is known that it is necessary to have polarimeters available, suitable to work in the EUV band in the context of EUV sources, such as for example free-electron X-ray lasers (free-electron lasers or FELs), higher harmonic generators (high harmonic generators or HHG) and, in general, in EUV sources in which the control of the linear polarization angle is important.

By EUV sources we mean radiation sources with a wavelength comprised approximately between 4 nm and 100 nm.

The limited availability of polarimeters in the EUV band, and the fact that those existing do not completely satisfy requirements in terms of simplicity of use, cost and performance, derive from the fact that, in this band, matter absorbs the radiation effectively. Therefore, there are no transparent materials, such as for example calcite, with which to create prisms for the polarization of light, as happens in the visible field. In the EUV band it is therefore difficult to design efficient polarimeters, as it is only possible to use techniques based on Brewster's angle in reflection or, alternatively, on Rayleight scattering.

Polarimeters in the EUV band are known, which use a multilayer mirror, positioned in correspondence with Brewster's angle, which detects the X-ray pulse reflected by a sample that rotates along the axis of the incident radiation. One disadvantage of this solution is that, in order to obtain a single measurement, an acquisition must be completed over an entire rotation, over a period of time that may even be several days.

Another type of polarimeter provides to use cylindrical symmetry pyramids combined with a vacuum CCD (Charge Coupled Device) camera, which is very expensive. This type of polarimeter uses two reflections of electromagnetic radiation not exactly at Brewster's angle, so it is particularly suitable for sources characterized by energy above 500 eV and with high average photon intensity (synchrotron sources). The difficulties in alignment and its poor efficiency make this type not easy to use; moreover, the data produced during the measurements are few and the measurement speed is reduced due to the use of CCDs.

A solution is also known which is based on the different reflectivity in polarization s (perpendicular) and p (parallel) of 5 mirrors and a photodiode; this solution uses a double rotary axis, and is therefore expensive and slow in operation.

There is also a polarimeter for detecting scattering light from gases that are very dependent on polarization, which has a plurality of time-of-flight detectors equidistant on a circumference with a center corresponding to the axis of the electromagnetic radiation measured.

Due to its construction, this polarimeter allows to make a measurement in a single pulse, but it is very expensive. Moreover, it is very complex to produce, it has a high number of detectors, a consequent greater number of signals and fragile parts that can be potentially damaged, and decreasing efficiency for shorter wavelengths.

In another example of a polarimeter, the radiation is made to pass through a flow of helium, exciting a fluorescence response. Disadvantageously, in addition to the requirement for a controlled helium flow, additional optics are required for the refocusing of the beam, which also makes this system very expensive.

There are also known solutions that exploit the Bragg diffraction principle in crystalline materials, applicable to the detection of the degree of polarization of the rays of a beam, or devices for measuring the polarization of the rays of a synchrotron radiation beam that use multilayer films.

In Hoover R. B. et al: "Imaging polarimeters for solar extreme ultraviolet astronomy", Optical engineering, Soc. Of photo-optical instrumentation engineers, Bellingham, vol. 30, no. 8, 1 Aug. 1991 (1991 Aug. 1), pages 1169-1176, XP000222822, ISSN: 0091-3286, DOI: 10.1117/12.55923, a polarimeter is described for radiations in the EUV band comprising two mirrors, the first of which divides the radiation incident on its angle of incidence into two parts, the first reflected and the second transmitted toward the second mirror. The polarimeter operates in correspondence with Brewster's angle with respect to the incident radiation. The polarimeter also comprises two detectors positioned so that the parts of radiation are incident to them.

Pelizzo M. G. et al: "Delay systems and phase retarders based on multilayers coated mirrors for FEL beam manipulation", Advances in x-ray free-electron lasers: radiation schemes, X-ray optics, and instrumentation, SPIE, 1000 20Th St., Bellingham WA 98225-6705 USA, vol. 8078, no. 1, 5 May 2011 (2011-05-05), pages 1-8, XP060013205, DOI:10.1117/12.886885 describes a system comprising two mirrors, the first of which divides the radiation incident on its angle of incidence into two parts, the first reflected and the second transmitted toward the second mirror, the system being able to provide a delay line for a part of the incident radiation.

From what has been described above, there is therefore the need to perfect an apparatus for measuring the polarization of an electromagnetic radiation, which can overcome at least one of the disadvantages of the state of the art.

One purpose of the present invention is to provide an apparatus able to measure the electromagnetic field polarization in EUV sources in a single measurement, and therefore with a single radiation pulse. In particular, a purpose of the invention is to provide a polarimeter able to measure a linear polarization angle. A purpose is also to provide a polarimeter able to measure, in general, the degree of polarization.

Another purpose of the present invention is to provide an apparatus for measuring the polarization of an electromagnetic radiation which is economically advantageous, with reduced production and operating costs.

Another purpose of the present invention is to provide an apparatus for measuring the polarization of an electromagnetic radiation which is relatively simple to use.

Another purpose is to perfect an effective and economical method for detecting the electromagnetic field polarization in EUV sources.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, the embodiments described here concern an apparatus for measuring the polarization of an electromagnetic radiation, and a method for using it, to detect the electromagnetic field polarization in EUV sources.

The apparatus comprises a source of EUV (Extreme Ultraviolet) electromagnetic radiation and a polarimeter.

The polarimeter is able to detect at least one linear polarization angle of the electromagnetic radiation. Additionally, the polarimeter can be configured to detect the degree of polarization.

The polarimeter comprises two mirrors positioned, with respect to an axis of a radiation incident to them and to the normal vector to the reflecting surface, in correspondence with the Brewster's angle. The mirrors are also positioned according to two planes of incidence—that is, the planes that contain the axis of the incident radiation, the axis of the reflected radiation and the normal vector to the reflecting surface—which are orthogonal to each other. The polarimeter also comprises two detectors and a processing apparatus.

A first of the two mirrors can have a very sharp edge of incidence. Furthermore, it is positioned, or it can be positioned, in such a way that the electromagnetic radiation is incident on the edge of incidence. In particular, the edge of incidence is positioned, or it can be positioned, in correspondence with the axis of the radiation.

Advantageously, the edge of incidence divides the incident electromagnetic radiation into two exact parts when the first mirror is positioned in such a way that the electromagnetic radiation is incident exactly on such edge of incidence. In particular, the division into two parts is understood in the sense of the intensity of the incident radiation, half of which is reflected and half of which is transmitted on the first of the two mirrors. In the present text, by the term "transmitted" or "not deflected" we mean that the corresponding part of the radiation passes beyond the mirror without passing through it, in the sense that the optical path of the part of radiation transmitted remains outside the mirror.

The mirror is positioned, or it can be positioned, in such a way as to perform a single reflection at the exact Brewster's angle of one of the parts of the electromagnetic radiation.

The second mirror can be positioned in such a way that the other part of the electromagnetic radiation is incident on it. It is also positioned, or it can be positioned, in such a way as to perform a reflection at the exact Brewster's angle of the other part of the electromagnetic radiation.

An advantage is that the configuration of the mirrors described above allows to decompose the incident electromagnetic radiation into two equal polarization components. In particular, advantageously, since the mirrors are positioned according to two planes of incidence orthogonal to each other, the two polarization components are also orthogonal to each other.

An advantage is that the geometry as above allows to maximize the sensitivity to the vertical and horizontal states of polarization of the incident radiation.

According to some embodiments, the mirrors comprise a support on which a thin film of Niobium is deposited. Advantageously, Niobium has a good reflectivity in the EUV band, approximately 3%, and a good extinction ratio Rs/Rp, approximately of the order of $10^2$, of the polarization p with respect to the polarization s.

The polarimeter can comprise a linear movement system for moving at least the mirror positioned first along the trajectory of the radiation, so as to position it in such a way that the incoming electromagnetic radiation is incident on the edge of incidence described above. Advantageously, the linear movement system can allow a fine linear adjustment of the mirror. An advantage is also that, in this way, the adjustment of the position of the mirror with respect to the source of the radiation becomes easier.

The polarimeter can comprise angular adjustment systems of one or both mirrors. Advantageously, the angular adjustment systems can allow a fine angular adjustment of the mirrors.

Thanks to this angular adjustment, it therefore becomes possible for the mirrors to easily follow the Brewster's angle as the energy of the incident electromagnetic radiation varies.

The polarimeter comprises one detector positioned in such a way that the first part of the radiation is incident to it, and another detector positioned in such a way that the reflected part, on the second of the mirrors, of the second part of the radiation is incident to it.

The detectors, when hit by the corresponding part of the incident radiation, are configured to generate a corresponding electrical signal, which is sent to the processing apparatus.

Advantageously, the detectors are detectors with high temporal resolution Micro-Channel Plates (MCP), which have a high sensitivity and allow to achieve a good signal/noise ratio.

In this way, it can be possible to calculate, by means of the processing apparatus, at least the polarization angle of the radiation on a single pulse of the radiation.

According to some embodiments, the method for using an apparatus for measuring the polarization of an electromagnetic radiation to detect the electromagnetic field polarization in EUV sources provides:

the division of an incident radiation into two equal polarization parts orthogonal to each other;
the reflection of one part of the radiation at the exact Brewster's angle;
the transmission of the other part and its subsequent reflection at the exact Brewster's angle;
the simultaneous detection of the intensities of the two reflected parts;

the processing of an electrical signal associated with the intensities of the two parts.

The method can also provide a preliminary step of initial linear adjustment of the positioning of the mirror positioned first along the trajectory of the radiation, so that the radiation is incident on an edge of incidence of the mirror.

The method can also provide a preliminary step of angular adjustment of the inclination of one and/or the other of the mirrors in order to adjust the Brewster's angle.

An advantage is that the polarimeter according to the invention does not require, after the first step(s) of preliminary alignment described above, further mechanical movements to carry out the measurement.

BRIEF DESCRIPTION OF THE DRAWINGS

These and other aspects, characteristics and advantages of the present invention will become apparent from the following description of some embodiments, given as a non-restrictive example with reference to the attached drawings wherein.

Figure 1:
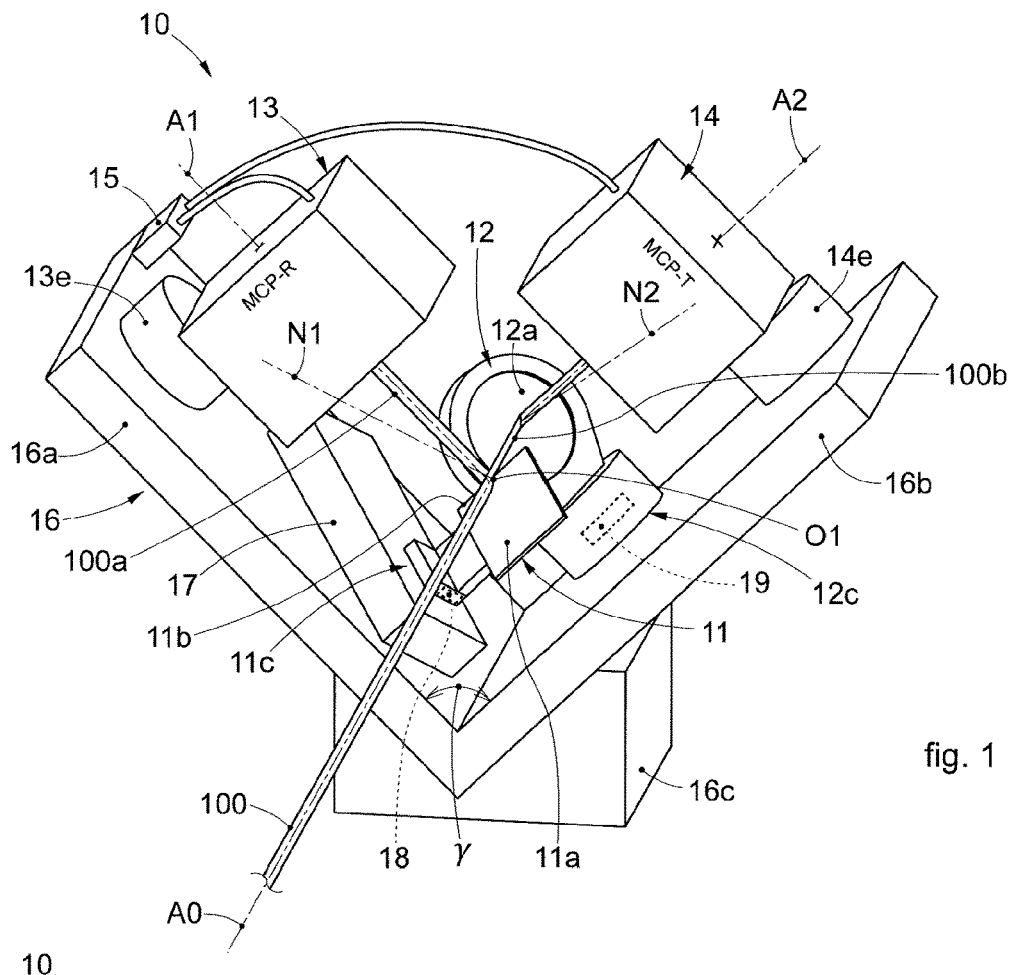
FIG. 1 is a schematic three-dimensional view of a polarimeter according to some embodiments described here.

To facilitate comprehension, the same reference numbers have been used, where possible, to identify identical common elements in the drawings. It is understood that elements and characteristics of one embodiment can be conveniently combined or incorporated into other embodiments without further clarifications.

DETAILED DESCRIPTION OF SOME EMBODIMENTS

We will now refer in detail to the possible embodiments of the invention, of which one or more examples are shown in the attached drawings, by way of a non-limiting illustration. The phraseology and terminology used here is also for the purposes of providing non-limiting examples.

With reference to FIGS. 1, 1a, 1b and 2, some embodiments described here concern an apparatus 50 comprising a source 200 that emits a collimated electromagnetic radiation, optionally a radiation in the extreme ultraviolet (EUV) spectrum, and a polarimeter 10 for measuring the polarization of the electromagnetic field of the electromagnetic radiation emitted.

The source 200 can be an optical collimator formed by one or more lenses and/or mirrors, a mechanical collimator for collimating the electromagnetic radiation by means of slits and/or grids, a synchrotron light source, an FEL, an HHG, an experimental apparatus comprising a sample 201 to be analyzed (FIG. 2) or suchlike. The person of skill in the art will understand that the examples of sources 200 of collimated electromagnetic radiation listed above are exemplary but not limiting and/or exhaustive, since any other source 200 of collimated electromagnetic radiation can be used without prejudice to the field and scope of the present invention.

By collimated electromagnetic radiation we mean a beam of electromagnetic waves, rays, which travel along substantially parallel straight lines, wherein the beam has a section transverse to the direction of propagation.

The polarimeter 10 which the present invention concerns is based on a concept similar to the Wollaston polarizers in the visible range, which provide:
  the division of an incoming electromagnetic beam into two equal and orthogonal polarization components;
  the simultaneous detection of the intensities of the two components; and
  the reconstruction of the polarization angle from the difference between the two intensities.

With reference to FIG. 1, the source 200 emits a collimated radiation 100 which travels along an axis A0.

The polarimeter 10 is able to be positioned in correspondence with a plane on which the radiation 100 is incident.

The polarimeter 10 is configured to detect at least the linear polarization angle of the radiation 100.

Figure 3:
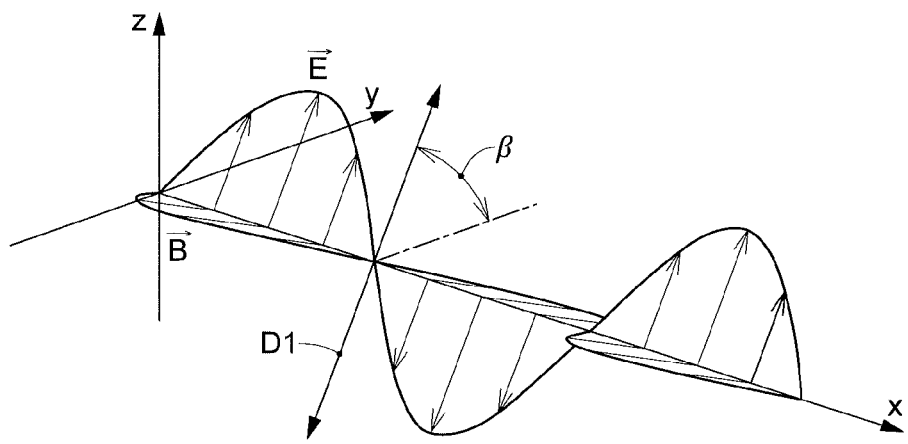
FIG. 3 is a schematic representation of a linearly polarized electromagnetic radiation.

As shown for example in FIG. 3, the linear polarization angle can be defined, in a Cartesian reference system XYZ in space, as the angle $\beta$ between a reference axis, the axis Y in the drawing, and the direction of polarization D1 of a linearly polarized radiation 100.

In the general case of partially polarized linear polarization, the polarimeter 10 can also be configured to detect the degree of polarization, defined as the ratio between the difference and the sum of the maximum intensity and the minimum intensity of the polarized electromagnetic radiation 100.

The polarimeter 10 can be able to measure the polarization of radiations 100 which have an energy comprised between 20 and 350 eV, preferably between 30 and 300 eV.

The polarimeter 10 comprises, as main components, two mirrors 11, 12, two detectors 13, 14 and a processing apparatus 15.

The polarimeter 10 can also comprise at least one support 16 for positioning at least some of the components as above, preferably a single support 16. In a preferential embodiment, at least the mirrors 11, 12 and the detectors 13, 14 can be positioned on the one or more supports 16.

According to some embodiments, the mirrors 11, 12 can be made by depositing, on a support, a layer 11a, 12a, single or multilayer, of one or more materials, conveniently selected to have maximum reflectivity of the polarization s at the Brewster's angle.

The layer 11a, 12a can be made by means of bulk materials, as long as they are not very rough. Alternatively, the layer 11a, 12a can be made by means of a thin metallic film.

According to a preferred embodiment, the layer 11a, 12a can consist of a single layer of thin film of Niobium. The thickness of the layer 11a, 12a of thin film can be comprised between 50 and 150 nm, preferably between 90 and 110 nm, even more preferably 100 nm.

The layer 11a, 12a can be deposited on a silicon support. The silicon support can have a flat surface for the deposition of the layer 11a, 12a.

The deposition of a layer 11a, 12a of thin film can be done by means of deposition techniques such as Sputtering techniques, molecular beam epitaxy MBE growth techniques (100 nm Molecular Beam Epitaxy-film) or suchlike, preferably by means of MBE techniques.

A first mirror 11 of the two mirrors 11, 12 has an edge of incidence 11b. The edge of incidence 11b can advantageously be a sharp edge.

By sharp edge of incidence 11b we mean an edge such that the radiation incident on the first mirror 11 hits parts of the surface that have exactly the same reflectivity characteristics. This can be achieved by depositing on a lateral face of the first mirror 11, at least in correspondence with the edge of incidence 11b, the same layer 11a deposited on a front face. Furthermore, it can be understood that the edge has an angle of 90.0°. It can also be understood that, in correspondence with the edge as above, the front and lateral faces of the first mirror 11 have a limited roughness, indicatively lower than 0.01 µm, preferably lower than 0.005 µm. By front face we mean the face of the mirror which, when the mirror is mounted in the polarimeter, faces toward the source 200 of electromagnetic radiation. By lateral face we mean a face of the mirror that is perpendicular to the front face.

Advantageously, the first mirror 11 can be positioned in such a way that the radiation 100 is incident on the edge of incidence 11b.

The first mirror 11 is the mirror that is located first along the trajectory of the radiation 100 emitted by the source 200. Hereafter, the other of the two mirrors can be referred to as second mirror 12.

Figure 1A:
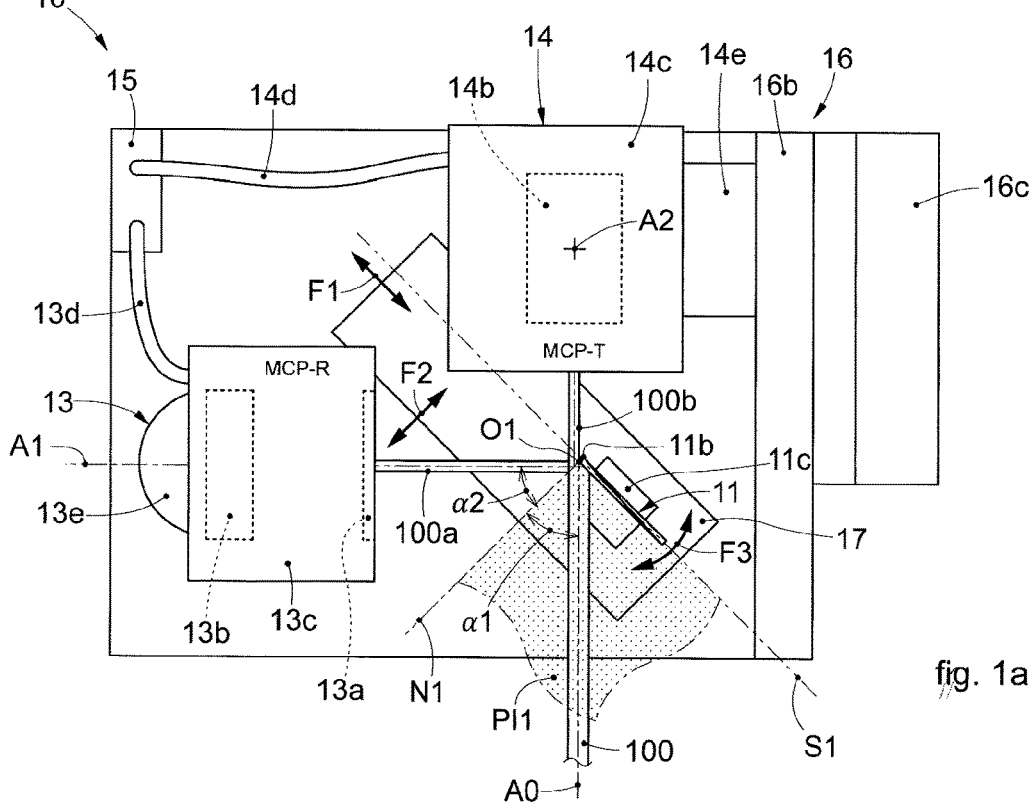
FIG. 1a is a top view according to the axis A2 of the polarimeter of FIG. 1.

In FIGS. 1, 1a, the point of incidence of the radiation 100 on the edge of incidence 11b of the first mirror 11 is indicated as O1, the axis of the radiation 100 incident on the first mirror 11 is indicated as A0.

The edge of incidence 11b of the mirror 11 can be able to divide the incident radiation 100 into two exact parts 100a, 100b when the first mirror 11 is positioned in such a way that the radiation 100 is incident exactly on its edge of incidence 11b. Part 100a corresponds to the radiation reflected by the first mirror 11, and part 100b to the radiation transmitted without being deflected by the first mirror 11. By part 100b we mean that part of radiation 100 emitted by the source 200 which is not incident on the edge 11b of the first mirror 11 and which continues its propagation along the axis A0. Hereafter, for simplicity, we will refer to the part 100b simply as transmitted radiation 100b.

As shown in FIGS. 1, 1a, the axis A1 is the axis of the radiation 100a reflected by the first mirror 11. The plane of incidence PI1 is defined as the plane identified by the axis A0 of the radiation 100, incident on the first mirror 11 and the normal N1 to the surface S1 of the first mirror 11. Furthermore, the axis A0 is also the axis of the part 100b of the radiation 100 before the reflection on the second mirror 12.

The first mirror 11 can be positioned, with respect to the incident radiation 100, in such a way that the angle of incidence α1 of the radiation 100 and the angle of reflection α2 of the reflected part 100a are equal to each other and correspond to the Brewster's angle. The angle of incidence α1 is an angle measured between the axis A0 of incidence and the perpendicular to the plane of the first mirror 11. The angle of reflection α2 is an angle measured between the perpendicular to the plane of the first mirror 11 and the axis of reflection A1.

The reflected part 100a is incident on the detector 13. The transmitted part 100b is incident on the second mirror 12.

The second mirror 12 is able to reflect the part 100b and to send it toward the detector 14. The second mirror 12 can be positioned, with respect to the incident part 100b, in such a way that the angle of incidence α3 and the angle of reflection α4 are equal to each other and correspond to the Brewster's angle. The angles of incidence α3 and of reflection α4 are defined in a similar way to the angles of incidence α1 and of reflection α2, respectively.

Figure 1B:
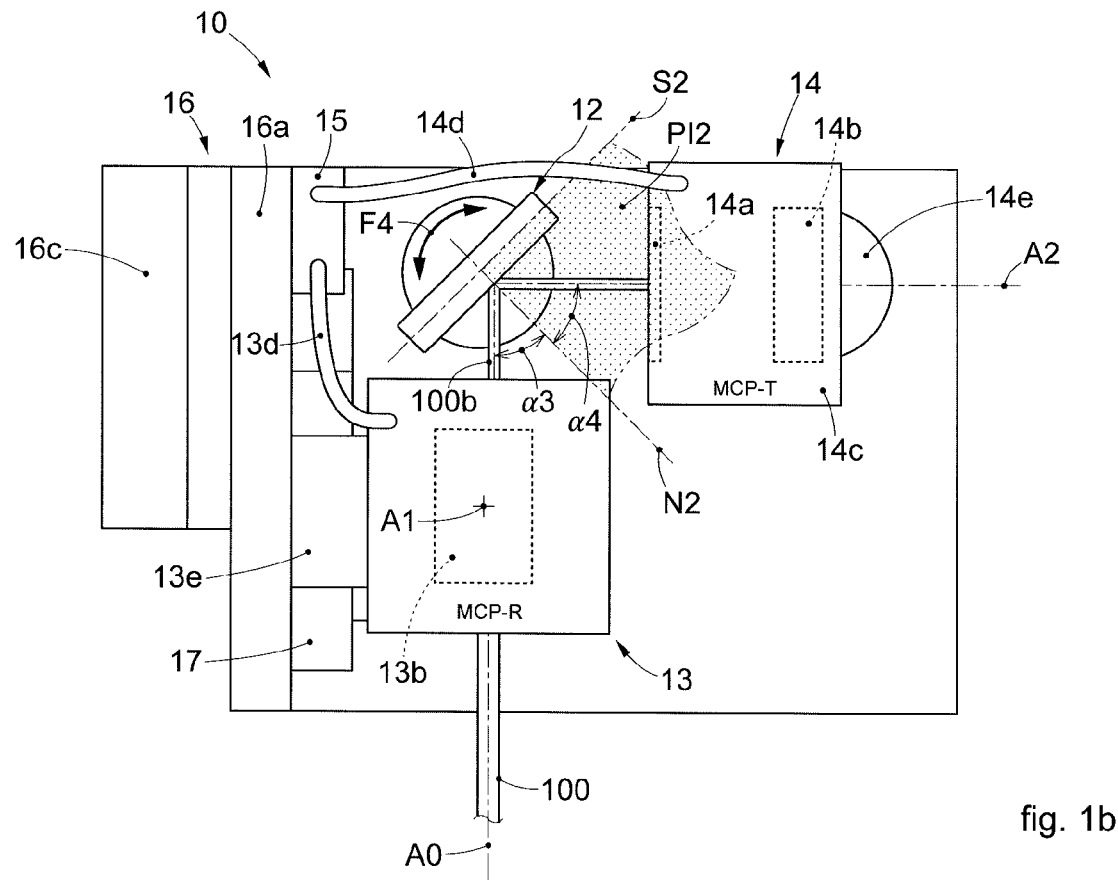
FIG. 1b is a top view according to the axis A1 of the polarimeter of FIG. 1.

As shown in FIGS. 1 and 1b, the axis A2 is the axis of the part 100b reflected by the second mirror 12. The plane of incidence PI2 is defined as the plane identified by the axis A0 of the part 100b, incident on the second mirror 12, and the normal N2 to the surface S2 of the second mirror 12.

The mirrors 11, 12 are positioned in such a way as to lie on two surfaces S1, S2 orthogonal to each other. Consequently, the mirrors 11, 12 have two planes of incidence PI1, PI2 orthogonal to each other.

The mirrors 11, 12 can also comprise a respective base 11c, 12c for their positioning. The bases 11c, 12c can be constrained to an external surface, such as a table or a top (in an embodiment not shown in the drawings), or be constrained to the one or more supports 16.

The bases 11c, 12c can be configured to constrain the mirrors 11, 12 in such a way that the two surfaces S1, S2 are orthogonal to each other.

In an embodiment not shown in the drawings, this can be achieved by means of a suitable shape of the bases 11c, 12c, for example a curved shape, or with two or more elements angularly inclined one with respect to the other. In an alternative embodiment, this can be achieved by constraining the bases 11c, 12c on the one or more supports 16, the supports 16 having a suitable shape.

Preferably, and as shown in FIG. 1, the support 16 can have two sides 16a, 16b disposed in a V-shape, which have an angle γ of 90° between them.

The support 16 can also have a base 16c to sustain the two sides 16a, 16b.

In one embodiment, at least the first mirror 11 can be moved manually to position it so that the emitted radiation 100 is incident on the edge of incidence 11b.

In one variant, at least the first mirror 11 can be replaceable with a mirror 11 of different sizes and such that the radiation 100 is incident on the edge of incidence 11b, for example as the position of the source 200 of radiation 100 varies with respect to the polarimeter 10, such as for example between different experiments.

In a preferential embodiment, the polarimeter 10 comprises a linear movement system 17 for moving at least the first mirror 11.

According to some embodiments, the base 11c can be constrained on the linear movement system 17.

By means of the linear movement system 17, the first mirror 11 can be moved in such a way that the radiation 100 is incident on the edge of incidence 11b. As indicated in FIG. 1a, the linear movement system 17 can be able to perform linear movements in the direction F1 and/or F2, preferably in the direction F1.

The linear movement system 17 can be a movement system that allows a fine adjustment of the position of the mirror 11. The linear movement system 17 can for example be a micrometric positioner, such as a micrometric positioner with a resolution better than 0.05 µm, preferably better than 0.01 µm.

According to some embodiments, not shown in the drawings, the linear movement system 17 comprises a YAG (Yttrium Aluminium Garnet) screen to detect the alignment of the mirror 11 with the radiation 100.

The inclination of the mirrors 11, 12 can be adjusted. In this way, it is possible for the mirrors to be inclined in correspondence with the Brewster's angle.

By adjusting the angle of inclination of the first mirror 11 (indicated with F3 in FIG. 1*a*), the mirror 11 can be advantageously able to perform a reflection at the exact Brewster's angle α1, α2.

By adjusting the angle of inclination of the second mirror 12 (indicated with F4 in FIG. 1*a*), the mirror 12 can be able to perform a reflection at the exact Brewster's angle α3, α4.

Figure 4:
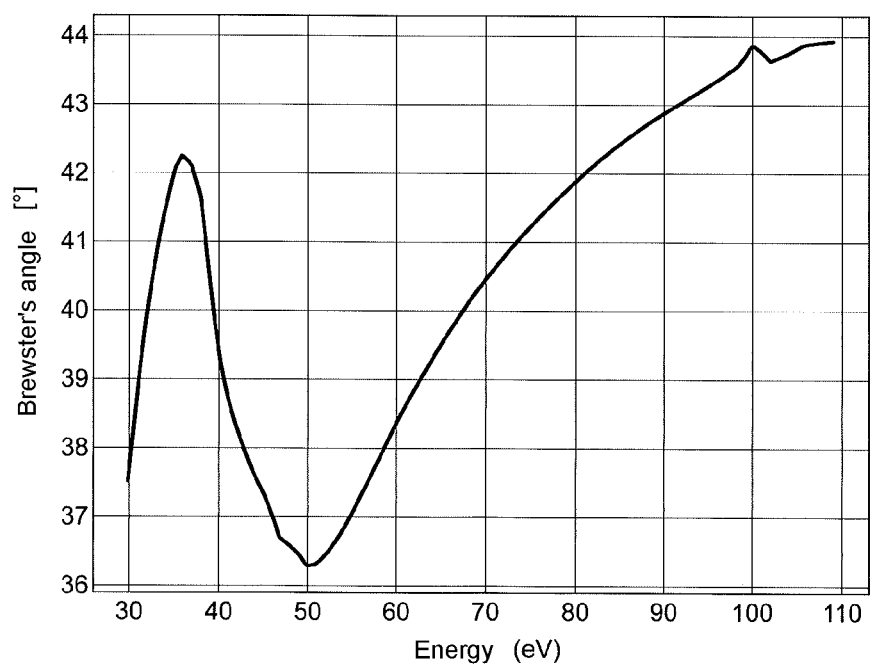
FIG. 4 is a graph that represents the Brewster's angle as the energy of an incident radiation varies.

In particular, the Brewster's angle can vary depending on the energy band of the incident radiation 100, as shown in FIG. 4. By modifying the inclination of the mirrors 11, 12 it can therefore be possible to follow the variations of the Brewster's angle depending on the energy band of the incident radiation 100.

The polarimeter 10 can comprise angular adjustment systems 18, 19, of the first and/or second mirror 11, 12 respectively.

The angular adjustment systems 18, 19 can be adjustment systems that allow a fine adjustment of the angular position of the mirrors 11, 12. For example, the angular adjustment systems 18, 19 can be goniometric positioning plates, with resolution better than 0.1°, preferably better than 0.05°, even more preferably better than 0.0005°. As another example, the angular adjustment system 18 can be an autonomous adjustment system or it can be integrated with the linear movement system 17 into a single device, such as a hexapod system.

In one variant, the mirrors 11 and/or 12 can be moved manually.

According to some embodiments, the detectors 13, 14 can be photodiodes or in-vacuum CCD cameras, for example for high radiation intensities. According to preferred embodiments, the detectors 13, 14 can be photomultipliers, or detectors with high temporal resolution or suchlike; preferably, they are detectors with high temporal resolution such as Micro-Channel Plates (MCP).

In particular, the MCP detectors 13, 14 can be two MCPs much more sensitive than standard solutions. They can be single MCPs, charged at voltages lower than 700 V to have a linear response as a function of the incident radiation (not in single-photon counting). The MCPs can possibly have coatings to maximize response in an EUV region of interest.

The detectors 13, 14 can be configured at least to send electrical signals corresponding respectively to the parts 100*a*, 100*b* of the radiation 100 to the processing apparatus 15.

The detectors 13, 14 can comprise an optic 13*a*, 14*a*, a signal electronics 13*b*, 14*b* and a casing 13*c*, 14*c*.

The detectors 13, 14 can also comprise a conductor 13*d*, 14*d* for connection with the processing apparatus 15. Advantageously, the conductor 13*d*, 14*d* can be a coaxial cable which has SMA-type connectors, in order to reduce the generation of noise, for example from electromagnetic interferences radiated or generated by the materials and/or the connection architecture.

The detector 13, in reflection (MCP-R), is positioned in such a way that the part 100*a* of the radiation reflected by the first mirror 11 is incident on it. In particular, the part 100*a* is incident on the optics 13*a*.

The detector 14, in transmission (MCP-T), is positioned in such a way that the part 100*b* of the radiation reflected by the second mirror 12 is incident on it. In particular, the part 100*b* is incident on the optics 14*a*. The detectors 13, 14 can also comprise a base 13*e*, 14*e* to position the detectors 13, 14. The base 13*e*, 14*e* can be constrained to an external surface, such as a table or a top (in an embodiment not shown in the drawings), or be constrained to the one or more supports 16.

The bases 13*e*, 14*e* can be configured to constrain the detectors 13, 14 so that the parts 100*a*, 100*b* of the radiation 100 reflected by the mirrors 11, 12 are incident on the corresponding optics 13*a*, 14*a* in a substantially perpendicular way. In an embodiment not shown in the drawings, this can be achieved by means of a suitable shape of the bases 13*e*, 14*e*, for example a curved shape, or with two or more elements inclined with respect to each other. In a preferential embodiment described in FIGS. 1, 1*a* and 1*b*, this can be achieved by means of the shape of the support 16, for example in the shape of a V.

The processing apparatus 15 can comprise a processing device and a storage device (not shown in the drawings) on which a signal processing algorithm can be installed or is able to be installed.

The storage device can be connected to the processing device and be selected from commercially available ones, such as a random access memory (RAM), a read-only memory (ROM), a hard disk or any other form of digital storage whatsoever. It can be able to store the signals coming from the detectors 13, 14 and, possibly, the signal processing algorithm.

The processing device can be any form of computer processor that can be used advantageously to execute the signal processing algorithm in order to process electrical signals associated with components of electromagnetic radiations 100.

The processing apparatus 15 can be configured to acquire electrical signals, corresponding to the parts 100*a*, 100*b* of the radiation 100, sent by the detectors 13, 14.

The processing apparatus 15 can be configured at least for the simultaneous detection of the intensities of the two signals corresponding to the parts 100*a*, 100*b* of the radiation 100, and for the reconstruction of the polarization angle from the difference between the two signals. The processing apparatus 15 can also be configured to calculate the degree of polarization starting from the signals as above.

The processing apparatus 15, by means of the processing algorithm as above, can be able to calculate at least the polarization angle of the radiation 100 for each single pulse of the radiation 100.

According to some embodiments, the polarimeter 10 can comprise, between the detectors 13, 14 and the processing apparatus 15, one or more devices for the electronic conditioning of the signals (not shown in the drawings). For example, the one or more devices can comprise amplifiers, for example amplifiers indicatively at 22 dB or suchlike, filters, analog/digital converters or suchlike.

Advantageously, the high sensitivity of the detectors 13, 14 and/or the choice of conductors 13*d*, 14*d* capable of reducing the generation of noise allow to improve the signal/noise ratio of the polarimeter 10.

Advantageously, in order to improve the signal/noise ratio, the polarimeter 10 can comprise a waveform digitizer, preferably a CAEN v1761 digitizer, able to digitize signals for example at a sampling frequency of 4 GHZ.

An advantage is that the signal/noise ratio with which the measurement is carried out allows to make an estimate at least of the polarization angle on a single pulse of electromagnetic radiation 100. In particular, the polarization angle can be determined with a single pulse of the order of $10^7$ photons.

It is therefore possible to reduce the time required to conduct the experiment, increase the number of measurements thus carried out and increase the reproducibility of the measurements.

The polarimeter 10 can comprise a rotation system (not shown in the drawings) for its rotation around the axis A0 of the incident radiation 100. Advantageously, by means of the rotation of the polarimeter 10 around the axis A0 and the detection of the intensities of the parts 100a and 100b on different angles of rotation, it is also possible to calculate the degree of polarization of the radiation 100.

Advantageously, the polarimeter 10 can comprise a feedback control system (not shown in the drawings) for the automatic execution of the measurements and possibly for the automatic adjustment of the linear adjustment systems 17 and/or the angular adjustment systems 18, 19 and/or the rotation system.

Figure 2:
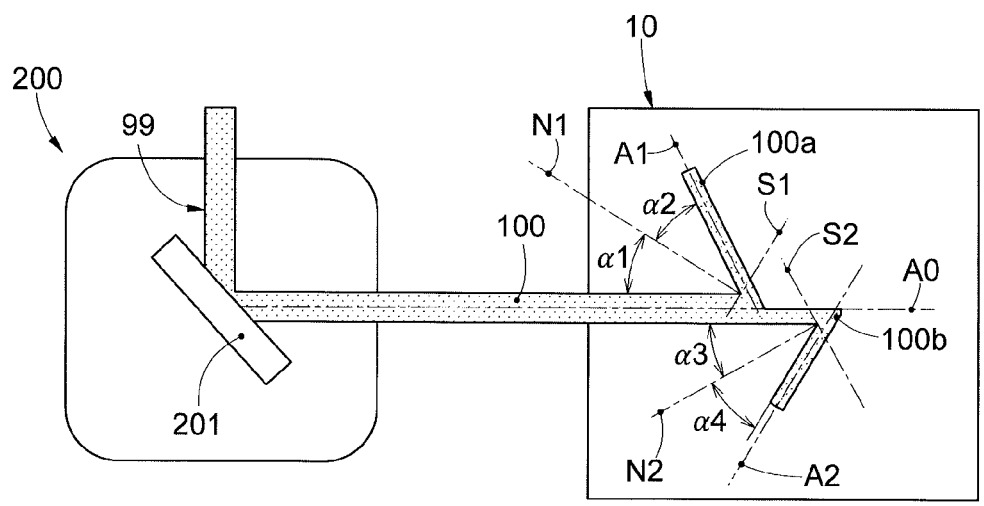
FIG. 2 is a schematic view of an apparatus for measuring the polarization of an electromagnetic radiation according to the invention, comprising the polarimeter of FIG. 1, during use.

By way of example and as shown in FIG. 2, the polarimeter 10 can be used in an experimental configuration for a dynamic magnetization study by means of RMOKE (resonant magneto-optic Kerr effect) on a permalloy alloy 201, such as $Ni_{80}Fe_{20}$. An electromagnetic radiation 99 emitted by an EUV emitter, such as an FEL or suchlike, interacts with the source 200, in the example an experimental apparatus comprising a sample 201 to be analyzed. The interaction with the sample 201 can alter the state of polarization of the radiation 99. The radiation 100 altered in the state of polarization is detected by the polarimeter 10, which generates the parts 100a and 100b of the incident radiation 100.

According to some embodiments, the method for using an apparatus 50 for measuring the polarization of an electromagnetic radiation 100 according to the invention provides:
- the emission of a radiation 100 along the axis A0, by means of a source 200 of radiation;
- the division of the incident radiation 100 into two exact orthogonal parts 100a, 100b of polarization by means of a first mirror 11;
- the reflection of one part 100a of the radiation 100 at the exact Brewster's angle by means of the first mirror 11;
- the transmission, by means of the first mirror 11, of the other part 100b of the radiation 100 and its subsequent reflection at the exact Brewster's angle by means of a second mirror 12;
- the simultaneous detection of the intensities of the two reflected parts 100a, 100b;
- the processing of an electrical signal associated with the intensities of the two parts 100a, 100b.

The acquisition, and possibly the processing, of the electrical signal associated with the intensities of the two parts 100a, 100b can provide the reconstruction of the polarization angle starting from the difference between the two signals.

According to one variant, the method of use can provide to repeat the acquisition of the intensities of the two parts 100a, 100b in correspondence with different angles around the axis A0, in order to calculate the degree of polarization.

According to the variant described above, the method of use can provide to make the polarimeter 10 rotate around the axis A0 of the incident radiation 100, and the simultaneous acquisition of signals corresponding to the intensities of the parts 100a, 100b of the incident radiation 100 on different angles of rotation. It can then provide to process the electrical signal associated with the intensities of the two parts 100a, 100b starting from the difference between the signals associated with the measurements of the intensity of the two parts 100a, 100b for each angle of rotation in correspondence with which a measurement is made.

Preferably, the simultaneous acquisition can be repeated with the polarimeter in a position rotated by +/−45° on the axis A0. In this case, the numerical value obtained as a difference/sum corresponds to the degree of polarization.

According to some embodiments, the method for using a polarimeter 10 can provide a preliminary step of initial linear adjustment of the positioning of a first mirror 11, in such a way that the radiation 100 is incident on an edge of incidence 11b of the mirror 11.

The method can provide to divide the radiation 100, on the edge of incidence 11b, into two exact parts, to reflect one of the parts 100a of radiation 100 and to transmit the other part 100b of radiation 100 toward the other mirror 12.

The method of use can also provide a preliminary step of angular adjustment of the inclination of one or both of the mirrors 11, 12 in order to adjust the Brewster's angle according to the energy band of the incident radiation 100.

An advantage is that the polarimeter 10 according to the invention does not require, after the first step(s) of preliminary alignment, additional mechanical movements to carry out the measurement.

It is clear that modifications and/or additions of parts or steps may be made to the polarimeter 10 and to the corresponding method of use as described heretofore, without departing from the field and scope of the present invention as defined by the claims.

In the following claims, the sole purpose of the references in brackets is to facilitate reading and they must not be considered as restrictive factors with regard to the field of protection claimed in the specific claims.

The invention claimed is:

1. Apparatus for measuring the polarization of a radiation in the Extreme Ultraviolet (EUV), comprising a source of said electromagnetic radiation and a polarimeter;
   wherein said polarimeter has two mirrors positioned according to two planes of incidence orthogonal to each other, a first plane of incidence of said planes being defined as the plane identified by an axis of said radiation, incident on a first of said mirrors, and the normal to the surface of said first mirror, wherein said first mirror comprises an edge of incidence positioned in correspondence with said axis in order to divide said radiation into two equal parts, reflect a first part of radiation and transmit a second part of radiation toward the second of said mirrors, which is able to reflect said second part, both mirrors being positioned in correspondence with the Brewster's angle with respect to said respective parts of radiation; and
   wherein said polarimeter comprises one detector positioned in such a way that said first part of the radiation is incident on it, and another detector positioned in such a way that the reflected part, on the second of said mirrors, of said second part of the radiation is incident on it, said detectors being configured to generate a respective electrical signal and to transmit it to a processing apparatus.

2. Apparatus as in claim 1, wherein said first mirror is made by depositing a layer of material on a support and, at least in correspondence with the edge of incidence, said layer of material is deposited both on a lateral face and also on the front face of the first mirror and the material is the same.

3. Apparatus as in claim 1, wherein said detectors are detectors with high temporal resolution Micro-Channel Plates (MCP).

4. Apparatus as in claim 1, wherein said processing apparatus is configured to calculate at least the polarization angle of the radiation for each single pulse of the radiation.

5. Apparatus as in claim 1, wherein said mirrors comprise a Silicon support with a flat surface and in that a layer of thin film of Niobium is deposited on the support.

6. Apparatus as in claim 1, wherein said polarimeter comprises a linear movement system for moving the first mirror.

7. Apparatus as in claim 1, wherein said linear movement system is able to move said first mirror in such a way that the radiation is incident on said edge of incidence.

8. Apparatus as in claim 6, wherein said linear movement system comprises a YAG screen able to detect the alignment of said first mirror with the radiation.

9. Apparatus as in claim 1, wherein said polarimeter comprises angular adjustment systems of one and/or the other of said mirrors.

10. Method for using an apparatus as in claim 1, wherein the emission of a radiation along the axis A0 by means of a source of radiation;

the division of the radiation into two parts by means of a first mirror;

the reflection of one part of the radiation at the exact Brewster's angle by means of said first mirror;

the transmission of the other part of the radiation by means of said first mirror and its subsequent reflection at the exact Brewster's angle by means of a second mirror;

the simultaneous detection of the intensities of the two reflected parts;

the acquisition of an electrical signal associated with the intensities of the two parts.

11. Method as in claim 10, wherein it provides the linear adjustment of the positioning of a mirror so that the radiation is incident on one of its edges of incidence.

12. Method as in claim 11, characterized in that wherein it provides to divide the radiation, on said edge of incidence, into two equal parts, to reflect one of the parts of radiation and to transmit the other part of radiation toward another mirror.

13. Method as in claim 12, wherein it provides the angular adjustment of one and/or the other of said mirrors in order to adjust the Brewster's angle as a function of the energy band of the radiation.

* * * * *